United States Patent [19]
Huff

[11] 4,088,714
[45] May 9, 1978

[54] CROSS-LINKED MELT-FLOWABLE THERMOPLASTIC ELASTOMER BLEND COMPRISING EPR OR EPDM, POLYETHYLENE AND POLYPROPYLENE

[75] Inventor: Terrence Huff, Baytown, Tex.

[73] Assignee: Exxon Research & Engineering Co., Linden, N.J.

[21] Appl. No.: 714,371

[22] Filed: Aug. 16, 1976

[51] Int. Cl.² ............................................. C08L 23/16
[52] U.S. Cl. .............................. 260/897 A; 260/23 H
[58] Field of Search .................................... 260/897 A

[56]  References Cited
U.S. PATENT DOCUMENTS

| 3,256,366 | 6/1966 | Corbelli | 260/897 |
| 3,256,367 | 6/1966 | Jayne | 260/897 |
| 3,957,919 | 5/1976 | Von Bodungen et al. | 260/897 A |

Primary Examiner—Carman J. Seccuro
Attorney, Agent, or Firm—Ben C. Cadenhead

[57] ABSTRACT

A cross-linked, melt-flowable thermoplastic elastomer blend of a monoolefin polymer rubber and cross-linkable low density polyethylene which are essentially fully cured in the presence of polypropylene is disclosed. The reprocessable blend has a much improved melt rheology and is useful for making flexible molded or extruded articles having an extremely good balance of mechanical properties, particularly high resiliency, tensile strength, flexural modulus, heat distortion resistance, low permanent set, and the like, without requiring vulcanization.

21 Claims, No Drawings

CROSS-LINKED MELT-FLOWABLE THERMOPLASTIC ELASTOMER BLEND COMPRISING EPR OR EPDM, POLYETHYLENE AND POLYPROPYLENE

BACKGROUND OF THE INVENTION

1. Field Of The Invention:

This invention relates to a cross-linked, melt-flowable thermoplastic elastomer blend and a method of making same.

2. Description Of The Prior Art:

Blends of monoolefin polymer rubbers, e.g., ethylene-propylene copolymer elastomers and ethylene, propylene and copolymerizable polyene terpolymer elastomers, with polyolefins, e.g., high density polyethylene, polypropylene and the like, which can be processed and fabricated by methods used for thermoplastics and have elastomeric properties without requiring vulcanization are well-known. Furthermore, thermoplastic elastomer blends of partially cured monoolefin copolymer rubbers and certain polyolefins are known. See, for example, U.S. Pat. Nos. 3,758,642 and 3,806,588. It is disclosed in both of these prior art patents that the partial curing of the monoolefin copolymer rubber is essential to produce a blend which has the characteristics of a thermoplastic resin, i.e., which can be reprocessed, while also having elastomeric characteristics.

However, known thermoplastic elastomer blends of monoolefin polymer rubbers and polyolefin resins suffer from the disadvantage of having less than desirable overall balance of mechanical or physical properties, such as low resiliency, tensile strength, stiffness, surface hardness, and/or high heat distortion, permanent or tension set, etc. Furthermore, many known blends, including blends prepared in accordance with the teachings of the above-mentioned U.S. Pat. Nos. 3,758,643 and 3,806,558 or U.S. Pat. No. 3,835,201, have less than desirable melt rheologies, e.g., high viscosity at high shear rates at the high melt temperatures normally used in injection molding. Such undesirable characteristics restrict the use of such known thermoplastic elastomer blends in the manufacture of many types of flexible molded or extruded articles. This is particularly evident in the manufacture of flexible body components for the automotive industry. For such a use, a thermoplastic elastomer is required which has such characteristics as relatively low viscosity at high shear rates at melt temperatures for use in high-speed injection molding or extrusion techniques to provide flexible body components having high resiliency, tensile strength, flexural modulus, etc. along with low permanent set, heat distortion and the like.

SUMMARY OF THE INVENTION

The present invention is based on the discovery that a thermoplastic elastomer blend having a surprisingly good balance of overall mechanical properties and improved melt rheology is provided by tightly, fully curing a monoolefin polymer rubber or elastomer of ethylene and propylene, with or without a copolymerizable polyene, and a cross-linkable low density polyethylene resin in the presence of an isotactic polypropylene resin. The thermoplastic elastomer blend of the invention accordingly is comprised of a substantially fully cross-linked non-melt-flowable discontinuous elastomer phase intimately dispersed in a melt-flowable continuous phase of polypropylene which provides surprisingly high compatibility without the necessity of chemical bonding of the respective polymer components. Unexpectedly, the inclusion of cross-linkable low density polyethylene and essentially fully and tightly curing it with the monoolefin polymer rubber in the presence of the polypropylene resin significantly increases the resiliency, tensile strength and surface hardness of the blend without substantially adversely affecting its heat distortion, flexural modulus and the like. Furthermore, the fully cured blend of the invention is completely thermoplastic, i.e., is melt-flowable and reprocessable, and exhibits improved melt rheology compared with known thermoplastic elastomer blends of partially cured or uncured monoolefin polymer rubbers with polyolefin resins.

DETAILED DESCRIPTION OF THE INVENTION

In carrying out the invention the monoolefin polymer elastomer or rubber, cross-linkable low density polyethylene resin and polypropylene resin are mixed with a curing agent for the rubber and the low density polyethylene components, and subjected to curing conditions. The amount of curing agent and the curing conditions are so selected to produce substantially complete cross-linking and tight curing of both the rubber and low density polyethylene components with each other which provides a substantially non-melt-flowable discontinuous elastomer phase intimately dispersed within a continuous melt-flowable phase of the polypropylene resin. The polymer components are present in respectively sufficient amounts to produce a non-melt-flowable discontinuous elastomer phase with multiple particle to particle impingements of the cross-linked polyethylene and rubber molecules in the form of discrete but impinging particles with the polypropylene continuous phase forming a continuum in the interstices to supply a flow mechanism and the required modulus and heat distortion resistance to the blend.

The monoolefin polymer rubber employed in the blend of the invention is an amorphous random elastomeric copolymer of ethylene and propylene with or without a copolymerizable polyene, such as a non-conjugated diene, e.g., 5-ethylidiene-2-norborene, 5-methylene-2-norborene, 1,4-hexadiene, and the like. Examples of such monoolefin polymer rubbers (EPR) which are useful in the invention include saturated ethylene-propylene binary copolymer rubbers (EPM) and ethylene-propylene-non-conjugated diene terpolymer rubbers (EPDM) which have a Mooney viscosity within the range of about 20 to about 120 (ML (1+8') at 212° F.), preferably about 40 to 90. The percentage of combined ethylene in such rubbers is generally in the region of about 40 to about 90 wt.%, preferably about 50 to about 80 wt.%, although the particular amount has not been found to be particularly critical in the invention. Similarly, in the EPDM rubbers, the diene content is normally within the range of from about 2.5 to about 10 wt.%, and preferably in the region of about 3.0 to about 9.5 wt.%. These monoolefin polymer rubbers and the methods for making same are well-known and are readily available commercially from a number of manufacturers. Therefore, such rubbers will not be discussed more particularly in detail, except to point out that any ethylene-propylene polymer rubber having the above characteristics, especially those which are presently commercially available, may be employed in the invention.

As will become more apparent below, it is essential to employ a cross-linkable low density polyethylene resin, i.e., a cross-linkable crystalline polyethylene resin having a density of no more than about 0.929 g/cc, in the blend of the present invention in order to obtain the desired high resiliency, surface hardness and tensile strength characteristics. It has been found that thermoplastic elastomer blends prepared as described above, and more particularly below, without a cross-linkable low density polyethylene, do not have such desirable mechanical properties.

Generally speaking, low density polyethylene is produced by high pressure polymerization of ethylene by a free radical process. Such processes are well-known to those having ordinary skill in the art and a wide variety of low density polyethylenes are commercially available which have a density of from about 0.915 to about 0.929 g/cc, a melt index of from about 0.2 to about 50 g. (190° C., 2160 g load at 10 minutes). Many of these resins also contain fillers, colorants, stabilizers, etc. as known in the art.

Accordingly, any of the commercially available cross-linkable polyethylene resins can be employed in the invention, including those with additives, so long as the additives do not adversely effect the balance of desired mechanical properties of the resulting thermoplastic elastomer blend. On the other hand, the preferred low density polyethylene resins are those having densities within the range of about 0.915 to about 0.929 g/cc, a melt index between about 2 to about 30 g/10 minutes.

Similarly, the polypropylenes useful in the invention include any commercially available isotactic polypropylene, i.e., isotactic polypropylene of greater than 90% hot heptane insolubles, manufactured by any known process. As known, such isotactic polypropylene resins are normally crystalline and have densities of from about 0.89 to about 0.91 g/cc and melt flow rates ranging from about 0.5 to about 30 g/10 minutes (MFR; 230° C., 2160 g load). It is preferred to employ a polypropylene having a melt flow rate of from about 1 to about 20 g/10 minutes.

The relative proportions of the above polymer components employed in the blends of the invention may be varied widely to provide desired optimum balance of mechanical properties, e.g., high resiliency, tensile strength, flexural modulus, heat distortion resistance, low permanent set, low viscosity at high shear, etc. It has been found that an extremely good balance of such mechanical properties is obtained by employing the polymer components in amounts within the following ranges, based upon the total weight of the polymer components employed:

| Polymer Component | wt. % |
| --- | --- |
| Monoolefin Polymer Rubber | 20–50 |
| Low Density Polyethylene | 15–50 |
| Polypropylene | 25–50 |

As indicated, the polymer components are preferably employed in respective amounts sufficient to provide at least a 1:1 ratio of cross-linked monoolefin polymer rubber and low density polyethylene-polypropylene. It has been found that such a ratio is adequate to provide a fully and tightly cross-linked non-melt-flowable discontinuous elastomer phase with sufficient multiple particle to particle impingements to provide elastomeric characteristics to the blend without adversely effecting the thermoplastic properties of the blend provided by the polypropylene.

In addition to the advantages mentioned above, the inclusion of low density polyethylene in the blend of the invention permits the employment of less than 50 wt.% monoolefin polymer rubber, based upon the weight of the total polymer components employed. So far as is known, prior art thermoplastic elastomer blends of monoolefin polymer rubbers and polyolefin resins have required the employment of at least 50 wt.% of the rubber in order to provide elastomeric properties. On the other hand, although the employment of higher levels of LDPE within the above-described range in accordance with the invention provides decreased low temperature impact strength, such amounts simultaneously result in somewhat higher resiliencies. Accordingly, the preferred blends of the present invention are prepared by employing a ratio of monoolefin polymer rubber:low density polyethylene of at least 1:1.

It has been found that an excellent balance of mechanical properties is obtained by employing about 40 to about 45 wt.% monoolefin polymer rubber, about 15 to about 20 wt.% low density polyethylene and about 30 to about 35 wt.% polypropylene in accordance with the invention, with these polymer components having respective Mooney viscosity, melt index, melt flow rate, etc., within the above-described preferred ranges. Such cross-linked melt-flowable thermoplastic elastomer blends have excellent resiliency, as evidenced by high bend recovery, low permanent set and the like, yet have relatively high tensile strength, flexural modulus, surface hardness, impact strength, and heat distortion resistance. Furthermore, such blends have excellent melt rheology, i.e., a relatively high viscosity at low shear rates but low viscosity at high shear rates, such that they are excellent products for high-speed injection molding and extrusion of flexible articles, such as automotive flexible body components.

As previously indicated, it is important in the present invention to fully and tightly cure the monoolefin polymer rubber and cross-linkable low density polyethylene resin in the presence of the polypropylene resin. This is accomplished by mixing into the above polymer composition a sufficient amount of a free radical generating agent or cross-linking agent capable of causing cross-linking of both the low density polyethylene and the monoolefin polymer rubber in a sufficient amount to produce substantially complete cross-linking of these cross-linkable polymer components when subjected to curing conditions, e.g., a temperature within the range of from about 350° F. to about 400° F. and provide a discontinuous elastomer phase which is essentially non-melt-flowable or processable at conventional thermoplastic processing temperatures, e.g., about 380° F. to about 550° F. Stated in other terms, the above curing agent is employed in a sufficient amount to produce a discontinuous elastomer phase under curing conditions which has a gel content in excess of about 95% (measured in xylene at 100° F. for more than about 16 hours), a conventional test for measuring the degree of curing of monoolefin copolymer rubbers.

Furthermore, it is preferred to incorporate the compound triallylcyanurate into the polymer component mixture prior to subjecting the mixture to curing conditions. It has been discovered that triallylcyanurate significantly enhances the curing of the elastomer and low density polyethylene components, as evidenced by increased resiliency, tensile strength and impact strength being obtained. Apparently, the triallylcyanurate initiates or increases tight cross-linking of the EPR and LDPE molecules.

Free radical generating agents or cross-linking agents capable of curing monoolefin polymer rubbers and cross-linkable polyethylene resins are well-known in the art, such as organic peroxides. Examples of such useful organic peroxides include dicumyl peroxide, di-tertiary butyl peroxide, tert-butyl perbenzoate, bis($\alpha,\alpha$-dimethylbenzyl)peroxide, 2,5-bis(tert.-butylperoxy)-2,5-dimethylhexane, $\alpha,\alpha'$ bis(tert.-butylperoxy)diisopropylbenzene, and others containing tertiary carbon groups, to name a few. Mixed peroxide-filler type curing systems or packages may also be employed if desired, such as Vulcup ® 40 KE, sold by Hercules Incorporated, which is comprised about 40 wt.% $\alpha,\alpha$-bis(t-butylperoxy)diisopropylbenzene on Burgess KE clay. Another example of a suitable peroxide-filler cure package includes Dicup ® 40 KE, which contains 40 wt.% dicumyl peroxide on Burgess KE clay, also sold by Hercules Incorporated.

Other known curing agents may be employed, provided they are capable of substantially fully cross-linking both the low density polyethylene resin and the monoolefin polymer rubber components, as indicated.

The particular amount of curing agent required to provide the required full curing of the monoolefin polymer rubber and cross-linkable polyethylene components is well-known in the art and may be readily determined by reference to appropriate literature provided by Hercules Incorporated, Wilmington, Del. By way of example, on organic peroxide is generally used in amounts of from about 0.5 to about 4 parts, preferably from about 1 to about 3 parts, per 100 parts of cross-linkable rubber and polyethylene. Additionally, the amount of triallylcyanurate required to increase the tightness of the curing has been found to be usually within the range of from about 0.1 to about 1.0 wt.%, based upon the weight of EPR and LDPE, with about 0.3 to about 0.7 wt.% being preferred.

As previously indicated, the cross-linked melt-flowable thermoplastic elastomer blends of the invention are prepared by intimately mixing the polymer components and curing agent components and then subjecting the mixture to a sufficient elevated temperature for a sufficient period of time with continuous mixing to tightly, fully cure the rubber and low density polyethylene components to form the essentially non-melt-flowable discontinuous elastomer phase dispersed throughout the continuous phase of polypropylene. Preferably, the curing is carried out by mixing at about 350° F. to about 400° F. for about 3 to about 7 minutes, with moderate shear to reduce the particle size of the resulting tightly cured discontinuous elastomer phase, to produce the above-described multiple particle to particle impingements with an interstitual continuum of polypropylene. Such curing and blending of components can be readily accomplished by employing standard polymer compounding equipment, such as a Banbury mixer, a Farrel continuous mixer, a twin screw extruder, etc.

During the aforementioned curing it has been found that the polypropylene resin tends to degrade or depolymerize. Therefore, it is also preferred to incorporate into the polymer component mixture prior to curing a compound capable of preventing such polypropylene degradation. However, experiments have shown that compounds conventionally incorporated into polypropylene blends to prevent polypropylene thermal and/or ultraviolet degradation do not prevent degradation of the polypropylene resin when the monoolefin polymer elastomer and LDPE are cured in its presence. In addition, compounds which are conventionally referred to as free radical traps and include p-benzoquinone, iodine, chloranil, and the like are likewise ineffective in preventing degradation. Moreover, free radical scavenging agents or stabilizers conventionally employed to ensure termination of the action of any remaining cross-linking agent in conventional compounding techniques for curing polyethylene and/or monoolefin polymer elastomers have not been found to prevent polypropylene degradation without also adversely effecting the curing of the cross-linkable components of the blend.

It has been discovered that sulfur and certain trifunctional monomers, specifically triallylcyanurate, triallylphosphate, tris (2,3-dibromopropyl) phosphate and mixtures thereof are capable of preventing degradation of the polypropylene under the above-mentioned curing conditions when incorporated into the polymer component mixture prior to curing. These compounds apparently prevent polypropylene degradation by cross-linking the polypropylene molecules as they degrade. Such protection is usually obtained with the compound being incorporated into the polymer component mixture in an amount within the range of from about 0.1 to about 1.0 wt.%, based upon the weight of polypropylene present. Accordingly, it is preferred to incorporate one or more of these compounds into the mixture in such amounts, preferably by preblending with the polypropylene at a moderate temperature to ensure intimate dispersion therewith. Although all of the above compounds have been found to prevent or retard polypropylene degradation, it is particularly preferred to employ triallylcyanurate or triallylphosphate inasmuch as such compounds produce no odor.

The blends of this invention can also include fillers, stabilizers, antioxidants, processing aids, colorants and other known additives if desired in conventional amounts. The use of such additives and their effects on thermoplastic elastomer blends are well-known and, therefore, will not be specifically discussed.

More particularly, in preparing the blends of the invention, the monoolefin polymer rubber, low density polyethylene resin, curing agent and triallylcyanurate are preferably preblended, such as in a Banbury mixer at relatively low temperature, e.g., about 240° F. to about 300° F. to provide intimate and consistent dispersion throughout. The polypropylene resin is similarly preblended with its degradation prevention agent as previously mentioned. The two mixtures are then added to each other, mixed at a moderate temperature, e.g., about 310° F. to about 350° F. for intimate dispersion and then heated to a relatively higher temperature of about 360° F. to about 380° F. for about 4 to about 7 minutes to provide the above-described tight curing and formation of the essentially non-melt-flowable or non-melt-flowable discontinuous elastomer phase intimately dispersed within the polypropylene. The resulting thermoplastic elastomer blend, having an excellent melt rheology, can then be employed in any conventional injection molding or extrusion technique to produce flexible articles having superior overall mechanical properties.

The following examples more particularly illustrate the nature of the invention but are not intended to be limitative thereof. In the following examples, the mechanical property evaluations were made employing the following tests:

| TEST FOR | VIA | ASTM |
|---|---|---|
| Melt Processability | Melt Flow Rate (MFR) | D 1238 L |
|  | Viscosity Shear ($\eta$ vs $\gamma$) | (1) |
| Stiffness | Flexural Modulus | D 790 I.A. |
| Strength Properties | Tensile & Elongation at yield and fail | D 638 Speed D |
| Resiliency | Tension (Permanent) Set at fail | D 412, Sect. 5.5 |
|  | 90° Bend Test | (2) |
|  | Inland Bend Test | (3) |
|  | Durometer Hardness | D 2240 |
| Heat Distortion Resistance | Chevrolet Droop Test | (4) |
| Impact Strength | Notched Izod at −40° F. | D 256, Method A |

(1)Instron Capillary Rheometer: L/D and T as specified.
(2)5" × 0.5" × 0.125" specimen. 90° center bend, 3 sec. hold. Measure angle from the normal as function time.
(3)5" × 0.5" × 0.125" specimen. 180° bend about ⅛" diameter mandrel. Measure angle from the normal as function time.
(4)5" × 0.5" × 0.125" specimen condilevered 4" from free end in oven for 60 minutes. Distortion in cm from the normal.

Test specimens for the above mechanical property evaluations were produced on an HPM injection molding machine, 350 tons capacity, Egan 2" Reciproscrew feed. Furthermore, unless specified otherwise, the blends in the examples were prepared in a Banbury Model BR (2 lbs.) mixer.

EXAMPLE I

Several thermoplastic elastomer blends were prepared in accordance with the invention employing varying amounts of polymer components with amounts of a peroxide-containing cure package calculated to produce a tight, full cure of the elastomer phase of the monoolefin ethylene-propylene polymer rubber (EPR) and the low density polyethylene (LDPE). For comparative purposes, a blend was also prepared without the inclusion of LDPE. The compositions of the blends are set forth in the following Table 1.

TABLE 1

| Run No. | EPR(1) wt. % | PP(2) wt. % | LDPE wt. % | OTHER, wt. % |
|---|---|---|---|---|
| 1 | 20 | 29.9 | 46.3(3) | (3.2% Vulcup 40KE) (0.3% TAC) (0.1% Sulfur) |
| 2 | 21.3 | 24.9 | 49.8(3) | (3.4% Vulcup 40KE) (0.4% TAC) (0.1% Sulfur) |
| 3 | 34.3 | 39.9 | 22.8(4) | (2.6% Vulcup 40KE) (0.3% TAC) (0.1% Sulfur) |
| 4 | 37.1 | 34.9 | 24.8(4) | (2.8% Vulcup 40KE) (0.3% TAC) (0.1% Sulfur) |
| 5 | 40.0 | 39.9 | 17.1(4) | (2.6% Vulcup 40KE) (0.3% TAC) (0.1% Sulfur) |
| 6 | 43.4 | 34.9 | 18.6(4) | (2.8% Vulcup 40KE) (0.3% TAC) (0.1% Sulfur) |
| 7 | 52.3 | 44.9 | None | (2.5% Vulcup 40KE) (0.3% TAC) (0.1% Sulfur) |

(1)VISTALON ® 702, Exxon Chemical Company U.S.A. EPM: Mooney Viscosity (ML 1+8' at 212° F.) = 40; 64 wt. % ethylene.
(2)20 MFR polypropylene.
(3)LDPE: 1.6 MI; 0.929 g/cc Density
(4)LDPE: 6.5 MI; 0.922 g/cc Density Specifically, each blend was prepared by adding to a Banbury mixer operated at slow speed the EPR, either an ethylene-propylene copolymer rubber (EPM) or ethylene-propylene-diene terpolymer rubber (EPDM) as specified, the LDPE and the curing agent package, which included Vulcup 40 KE (supra) and 0.3 wt.% triallylcyanurate (TAC). The mixer ram was lowered and the speed adjusted to increase the temperature of the mixture to 250° F. which was held for 5 minutes. The mixer speed was then slowed and the contents dumped, sheeted, cooled and chopped to small squares. Similarly, the polypropylene resin was added to a Banbury mixer along with 0.1 wt.% sulfur and fluxed by mixer speed adjustment at 370° F. for 3 minutes followed by cooling, dumping, sheeting and particulating, as described above. The final thermoplastic elastomer blend was then prepared by Banbury mixing the designated amounts of the cross-linkable composition with the sulfur-containing polypropylene for 5 minutes at 320° F. for intimate mixture dispersion followed by mixing at 370° F. for 7 minutes to fully cure the elastomer phase. The mechanical properties of the blends are set forth in the following Table 2.

TABLE 2

| Sample No. | 1 | 2 | 3 | 4 | 5 | 6 | 7 | 8* |
|---|---|---|---|---|---|---|---|---|
| Tests |  |  |  |  |  |  |  |  |
| Viscosity/Shear ($\eta$ at $\gamma$ = 7.15 sec$^{-1}$), poise | 7.25×10$^3$ |  |  | 6.04×10$^3$ |  | 6.09×10$^3$ |  | 8.03×10$^3$ |
| ($\eta$ at $\gamma$ = 1430 sec$^{-1}$), poise | 1.44×10$^2$ |  |  | 1.16×10$^2$ |  | 1.23×10$^2$ |  | 1.80×10$^2$ |
| Flex. Mod. (×10$^{-3}$), psi | 36.0 | 33.6 | 30.4 | 24.8 | 28.3 | 22.2 | 33.3 | 31.8 |
| Tensile, Yield, psi | 1861 | No | 1389 | 1410 | 1465 | 1334 | No | 1270 |
| % Elong., Yield | 57 | Yield | 38 | 48 | 46 | 50 | Yield | 82 |
| Tensile, Fail, psi | 1968 | 1848 | 2735 | 1857 | 1890 | 1773 | 1437 | 1650 |
| % Elong., Fail | 240 | 225 | 388 | 358 | 280 | 228 | 242 | 388 |
| Tension Set, Fail | 130 | 108 | 220 | 208 | 125 | 88 | 120 | 150 |
| −40° F. Notch. Izod. (ft. lbs/inch) | 0.2 | 0.3 | 0.9 | 1.4 | 1.4 | 1.5 | 4.0 | DNB |
| Durometer, 10 sec. delay | 49 | 46 | 44 | 41 | 41 | 39 | 42 | 32 |
| Recovery from 90° bend, 3 sec. hold (degrees) |  |  |  |  |  |  |  |  |
| at 2 min. | 10.0 | 9.5 | 9.5 | 8.5 | 9.0 | 8.0 | 14.0 | 13.5 |
| at 60 min. | 9.0 | 8.5 | 8.0 | 7.5 | 7.5 | 7.0 | 12.0 | 12.5 |
| Inland Bend, 5 min. |  |  |  | 14 |  | 14 | 19 | 21 |
| Chevrolet Droop Test: at 270° F., cm droop | 2.6 | 3.7 | 1.6 | 2.0 | 1.5 | 1.8 | 0.8 | 0.9 |

*TPR 1900, Uniroyal, Inc.

For comparative purposes, Table 2 also includes mechanical property evaluations of TPR 1900, a thermoplastic elastomer blend manufactured and sold by Uniroyal, Inc. which is believed to be comprised of polypropylene and a partially cured monoolefin ethylene-propylene polymer rubber (EPM or EPDM) or a type of monoolefin ethylene-propylene polymer rubber having a zero shear viscosity of at least 1, produced in accordance with the teachings of one or more of U.S. Pat. Nos. 3,806,558; 3,758,643; or 3,835,201.

As illustrated, the blends of the invention, Samples 1-6, have an excellent balance of overall mechanical properties for thermoplastic elastomeric blends. Each of these blends have high resiliency and tensile strength and relatively good flexural modulus and heat distortion resistance. Moreover, they have significantly good melt rheologies as shown by the viscosity shear data. Such desirable mechanical properties are particularly evident in the preferred blends, Sample Nos. 3-6, which include an EPR/LDPE weight ratio in excess of 1.

Additionally, a comparison of Sample Nos. 7 and 8 to Sample Nos. 1-6, particularly 3-6, illustrates the significantly improved resiliency and tensile strength obtained by tightly, fully curing LDPE with the EPR. As previously mentioned, it is believed that the TPR 1900 of Sample No. 8 includes a partially cross-linked EPR and no LDPE. Sample No. 7 includes a tightly, fully cross-linked EPR with no LDPE. Furthermore, a comparison of these samples shows the significantly superior melt rheologies of the blends of the invention.

EXAMPLE II

Several thermoplastic elastomer blends were prepared in accordance with the procedure described in Example I but with the exception of employing varying levels of peroxide curing agent. More specifically, the amount of curing agent required to produce full curing of the elastomer phase was calculated and employed in one run. Two other runs were prepared employing ½ and ¼ of the required amount of curing agent, respectively. Additionally, a fourth run was prepared employing no curing agent. The respective amounts of components used to prepare each run, based upon the weights of the total compositions, and the mechanical properties of the resulting blends are set forth in the following Table 3.

TABLE 3

| Sample No. | 1 | 2 | 3 | 4 |
|---|---|---|---|---|
| Composition |  |  |  |  |
| EPR[1), wt. % | 43.3 | 44.4 | 44.9 | 45.5 |
| PP[2), wt. % | 34.9 | 34.9 | 34.9 | 34.9 |
| LDPE[3), wt. % | 18.6 | 19.0 | 19.3 | 19.5 |
| Other, wt. % |  |  |  |  |
| Sulfur | 0.1 | 0.1 | 0.1 | 0.1 |
| Vulcup 40 KE | 2.8 | 1.4 | 0.7 | None |
| TAC | 0.3 | 0.3 | 0.1 | None |
| Properties |  |  |  |  |
| Visc./Shear |  |  |  |  |
| ($\eta$ at $\gamma = 7.15$ sec$^{-1}$), poise | $6.09 \times 10^3$ | $4.21 \times 10^3$ | $3.49 \times 10^3$ | $1.77 \times 10^3$ |
| ($\eta$ at $\gamma = 1430$ sec$^{-1}$), poise | $1.23 \times 10^2$ | $1.22 \times 10^2$ | $1.20 \times 10^2$ | $1.15 \times 10^2$ |
| Room Temp. Flex. Mod., psi | 22,200 | 27.800 | 27,600 | 36,100 |
| Tensile, Yield, psi | 1334 | 1317 | 1306 | 1584 |
| % Elong., Yield | 50 | 73 | 77 | 37 |
| Tensile, Fail, psi | 1773 | 1440 | 1441 | 1600 |
| % Elong., Fail | 228 | 365 | 406 | 620 |
| Tension Set, Fail | 88 | 223 | 241 | 535 |
| Ang. Deflec. from 90° Bend, 3 sec. Hold (deg.) |  |  |  |  |
| at 2 min. | 8.0 | 9.5 | 12.0 | 11.0 |
| at 60 min. | 7.0 | 8.5 | 10.5 | 9.5 |
| Chevrolet Droop at 270° F., cm | 1.8 | 1.9 | 2.2 | 1.8 |
| Notched Izod at $-40°$ F., ft. lbs./inch | 1.5 | 2.2 | 8.1 | 0.9 |
| Durometer/-/10 | 39 | 42 | 36 | 37 |

[1)VISTALON ® 702, Exxon Chemical Company U.S.A. EPM: Mooney Viscosity (ML 1 + 8' at 212° F.) = 40; 64 wt. % ethylene.
[2)Polypropylene: MFR = 20.
[3)Low Density Polyethylene: MI = 6.5; 0.922 g/cc Density.

As illustrated, the fully cured blend (Sample 1) had significantly superior resiliency, tensile strength, and low permanent set with comparable to superior impact strength and heat distortion resistance as compared to the uncured and partially cured blends. The data further confirms that tight, full curing of the elastomer components of the blend is essential for maximum resiliency.

EXAMPLE III

For this example several cross-linked thermoplastic elastomer blends were prepared in accordance with the procedure described in Example I employing the composition formulations set forth in the following Table 4. As indicated, Samples 1 (Sample 6, Table 2) and 2 were prepared by employing a cure system of an organic peroxide and TAC in amounts to provide tight, full curing of the elastomer and LDPE components. On the other hand, Samples 3 and 4 were prepared by employing a cure system of stearic acid, zinc oxide, mercaptobenzothiazole and tetramethylthiuram disulfite. This latter cure package or system is a conventional sulfur cure system for monoolefin polymer rubbers which will not cross-link or otherwise cure low density polyethylene resins. As illustrated by comparison of the results in the following Table 4, cross-linking of the low density polyethylene component with the elastomer component provides significantly increased resiliency.

TABLE 4

| Sample No. | 1[1) | 2 | 3 | 4 |
|---|---|---|---|---|
| Composition |  |  |  |  |
| Elastomer, wt. % | 43.3 | 43.3[2) | 48.3[3) | 41.7[3) |
| Polypropylene, wt. %[4) | 34.9 | 34.9 | 35.0 | 35.0 |
| Polyethylene, wt. %[5) | 18.6 | 18.6 | 18.1 | 19.3 |
| Other, wt. % |  |  |  |  |
| Vulcup 40 KE | 2.8 | 2.8 |  |  |
| TAC | 0.3 | 0.3 |  |  |
| Sulfur | 0.1 | 0.1 | 0.7 | 0.7 |
| Stearic Acid |  |  | 0.4 | 0.4 |
| ZnO |  |  | 2.1 | 2.1 |
| MBT |  |  | 0.2 | 0.2 |
| TMTDS |  |  | 0.7 | 0.7 |
| Properties |  |  |  |  |
| Room Temp. Flex Mod. × 10$^{-3}$, psi | 22.2 | 25.1 | 30.3 | 32.1 |
| $\eta$ at 7.15 sec$^{-1}$, poise | $6.09 \times 10^3$ | $6.19 \times 10^3$ |  |  |
| $\eta$ at 1430 sec$^{-1}$, poise | $1.23 \times 10^2$ | $1.13 \times 10^2$ |  |  |
| Tensile, Yield, psi | 1334 | 1369 | 1453 | 1484 |
| % Elong., Yield | 50 | — | — | — |
| Tensile, Fail, psi | 1773 | 2175 | 1889 | 1990 |
| % Elong., Fail | 228 | 402 | 330 | 335 |
| Tension Set, Fail | 88 | 202 | 131 | 139 |
| Chevrolet HD Test (cm droop) 270° F. | 1.8 | 1.2 | 1.3 | 1.3 |
| Inland Bend Test at 5 min. (°) | 14 | 16 | 20 | 20 |
| Notched Izod at $-40°$ F., ft.-lb/in. | 1.5 | 7.9 | DNB | DNB |
| Durometer max./ |  |  |  |  |

TABLE 4-continued

| Sample No. | 1[1] | 2 | 3 | 4 |
|---|---|---|---|---|
| Durometer 10 sec. Delay | -/39 | 47/41 | 44/37 | 45/38 |

[1]Sample 6, Table 2
[2]VISTALON ® 3708; Exxon Chemical Company U.S.A. EPDM: 75 Mooney Viscosity (ML 1 + 8' at 212° F.); 64 wt. % ethylene; 3.4 wt. % diene (ENB).
[3]VISTALON ® 2504, Exxon Chemical Company U.S.A. EPDM: 40 Mooney Viscosity (ML 1 + 8' at 212° F.); 50 wt. % ethylene; 4.2 wt. % ENB
[4]20 MFR; used in all samples.
[5]0.922 g/cc density; 6.6 MI; used in all samples.

EXAMPLE IV

In order to demonstrate that the discontinuous elastomer phase of the thermoplastic elastomer blend of the invention is substantially completely cross-linked and essentially non-melt-flowable, three cross-linked EPR-LDPE blends were prepared by employing a peroxide-TAC cure package calculated to provide full curing. The blends were prepared from the formulations set forth in the following Table 5 by melt-blending on a Farrel continuous mixer (No. 2) at 240° F. Sample pieces from the above mixture were prepared by compression molding and curing techniques (30 minutes at 350° F. and at 20 tons pressure after an initial 3 min. preheat at 3–5 tons pressure, 350° C. temperature) employing a compression molding machine from Pasadena Hydraulics, Inc. All of the resulting cross-linked elastomer blend samples were completely non-melt-flowable. Each sample was then tested to determine its gel or insoluble component content by solvent extraction with xylene for about 16 hours (non-jacketed extraction, temperature of xylene in extraction thimble ≃ 100° C.). At the conclusion of the extraction, the residue was dried overnight (~ 16 hours) at 105° C. and 10 mmHg vacuum and reweighed to determine the gel content. The results, also set forth in the following Table 5, show that each cross-linked elastomer blend had a gel content in excess of 95% which further confirms that the blends were completely cross-linked and fully cured.

TABLE 5

| Sample No. | 1 | 2 | 3 |
|---|---|---|---|
| Composition | | | |
| Elastomer, wt. % | 30[1] | 20[2] | 30[1] |
| Polyethylene, wt. % | 70[3] | 80[4] | 70[4] |
| Other, wt. % | | | |
| Vulcup 40 KE | 4.8 pph | 4.8 pph | 4.8 pph |
| TAC | 0.5 pph | 0.5 pph | 0.5 pph |
| White Oil | 0.5 pph | 0.5 pph | 0.5 pph |
| Gel, % | 95.9 | 95.7 | 95.5 |

[1]VISTALON ® 702, Exxon Chemical Company U.S.A. EPM: Mooney Viscosity (ML 1 + 8' at 212° F.) = 40; 64 wt. % ethylene.
[2]VISTALON ® 3708, Exxon Chemical Company U.S.A. EPDM: 75 Mooney Viscosity (ML 1+ 8' at 212° F.); 64 wt. % ethylene; 3.4 wt. % diene (ENB)
[3]6.5 MI; 0.922 g/cc density
[4]1.6 MI; 0.929 g/cc density.

EXAMPLE V

Several tightly cured, thermoplastic elastomer blends were prepared in accordance with the procedure described in Example I except that different elastomer components were employed to determine their effect on mechanical properties. The elastomers employed in the samples included:

(1) An EPM having a Mooney viscosity (ML 1+8' at 212° F.) of 40 and 64 wt.% ethylene (VISTALON ® 702, supra);

(2) An EPDM having a Mooney viscosity (supra) of 75, 64 wt.% ethylene and 3.4 wt.% diene (ENB), (VISTALON ® 3708, supra); and (3) An oil extended EPDM having a Mooney viscosity (supra) of 40, 60 wt.% ethylene and 5.0 wt.% diene (ENB), based on elastomer only, (MD 705, Exxon Chemical Company U.S.A.).

All samples were prepared using the same types of polypropylene and low density polyethylene, and with the same formulations as set forth in Table 6 below. As illustrated in the following Table 6, each of the blends had an excellent balance of mechanical properties, particularly in regard to melt rheology (viscosity/shear), tensile strength and resiliency.

TABLE 6

| Sample No. | 1 | 2 | 3 |
|---|---|---|---|
| Composition | | | |
| Elastomer, wt. % | 43.3[1] | 43.3[2] | 43.3[3] |
| Polypropylene,[4] wt. % | 34.9 | 34.9 | 34.9 |
| Polyethylene,[5] wt. % | 18.6 | 18.6 | 18.6 |
| Other, wt. % | | | |
| Vulcup 40 KE | 2.8 | 2.8 | 2.8 |
| TAC | 0.3 | 0.3 | 0.3 |
| Sulfur | 0.1 | 0.1 | 0.1 |
| Properties | | | |
| Viscosity/Shear | | | |
| ($\eta$ at 7.15 sec$^{-1}$) | $6.09 \times 10^3$ | $6.15 \times 10^3$ | $4.54 \times 10^3$ |
| ($\eta$ at 1430 sec$^{-1}$) | $1.23 \times 10^2$ | $1.36 \times 10^2$ | $0.87 \times 10^2$ |
| Room Temp. Flex. Mod. $\times 10^{-3}$, psi | 22.2 | 25.1 | 18.4 |
| Tensile, Yield, psi | 1334 | 1369 | 1000 |
| % Elong., Yield | 50 | — | — |
| Tensile, Fail, psi | 1773 | 2175 | 2150 |
| % Elong., Fail | 228 | 402 | 450 |
| Tension Set, Fail | 88 | 202 | 217 |
| Inland Resiliency (angle) at 5 min. | 14 | 16 | 17 |
| Chevrolet HD Test (cm droop) 270° F. | 1.8 | 1.2 | 2.0 |
| Impact Strength Notched Izod, ft. lbs./inch at −40° F. | 1.5 | 7.9 | DNB |
| Durometer/-/10 | 39 | 41 | 41 |

[1]VISTALON ® 702, Exxon Chemical Company U.S.A. EPM: Mooney viscosity (ML 1 + 8' at 212° F.) = 40; 64 wt. % ethylene.
[2]VISTALON ® 3708, Exxon Chemical Company U.S.A. EPDM: 75 Mooney Viscosity (ML 1 + 8' at 212° F.); 64 wt. % ethylene; 3.4 wt. % diene (ENB).
[3]MD 705 EPDM, Exxon Chemical Company U.S.A.
[4]20 MFR polypropylene
[5]6.5 MI, 0.922 density LDPE

EXAMPLE VI

In order to demonstrate the effect of triallylcyanurate on the cross-linking or curing of the EPR-LDPE elastomer phase and the effect of sulfur on polypropylene degradation, three blends were prepared from the formulations set forth in the following Table 7. The blends were prepared as described in Example I except, as noted, one blend (Sample No. 2) did not include TAC in the cure package while another blend (Sample No. 3) did not include mixing sulfur with the polypropylene. Furthermore, only one half of the amount of curing agent required to produce a full, tight cure of the elastomer phase was employed to permit the effect of the additives to be more readily delineated. For the same reason, Sample No. 3 was prepared with a relatively high molecular weight polypropylene resin (0.5 MFR).

TABLE 7

| Sample No. | 1 | 2 | 3 |
|---|---|---|---|
| Composition | | | |
| Elastomer, wt. %[1] | 44.4 | 44.5 | 44.5 |
| Polypropylene, wt. % | 34.9[2] | 34.9[2] | 35[3] |
| Polyethylene, wt. %[4] | 19.0 | 19.1 | 19.1 |
| Other, wt. % | | | |

TABLE 7-continued

| Sample No. | 1 | 2 | 3 |
|---|---|---|---|
| Vulcup 40 KE | 1.4 | 1.4 | 1.4 |
| TAC | 0.2 | None | 0.2 |
| Sulfur | 0.1 | 0.1 | None |
| Properties | | | |
| Viscosity/Shear | | | |
| ($\eta$ at $\gamma = 7.15$ sec$^{-1}$) | $4.21 \times 10^3$ | $3.32 \times 10^3$ | $3.21 \times 10^3$ |
| ($\eta$ at $\gamma = 1430$ sec$^{-1}$) | $1.22 \times 10^2$ | $1.17 \times 10^2$ | $1.04 \times 10^2$ |
| Room Temp. Flex | | | |
| Mod. $\times 10^{-3}$, psi | 27.8 | 25.9 | 20.4 |
| Tensile, Yield, psi | 1317 | 1313 | 1176 |
| % Elong., Yield | 73 | 48 | 69 |
| Tensile, Fail, psi | 1440 | 1277 | 1244 |
| % Elong., Fail | 365 | 385 | 335 |
| Tension Set, Fail | 223 | 250 | 198 |
| Ang. Deflec. from 90° Bend, 3 sec. hold (degr.) | | | |
| at 2 min. | 9.5 | 9.5 | 9.0 |
| at 60 min. | 8.5 | 7.5 | 7.5 |
| Chevrolet Droop at 270° F. | 1.9 | 2.4 | 3.6 |
| Improved Notched Izod at −40° F., ft. lbs/inch | 2.2 | 1.8 | 1.5 |
| Durometer/-/10 | 42 | 38 | 41 |

[1] VISTALON ® 702, Exxon Chemical Company U.S.A. EPM: Mooney Viscosity (ML 1 + 8′ at 212° F.) = 40; 64 wt % ethylene.
[2] 20 MFR polypropylene.
[3] 0.5 MFR polypropylene
[4] 6.5 MI; 0.922 g/cc density polyethylene A comparison of the mechanical properties of Samples 1 and 2 in Table 7 illustrates that the inclusion of triallylcyanurate in the cure package improves the cross-linking of the EPR-LDPE elastomer phase of the blend. As shown, Sample No. 1 has improved impact strength (notched izod), heat distortion resistance and tensile strength as compared to Sample No. 2 which was cured with no. TAC. Furthermore, a comparison of the properties of Sample No. 1 to those of Sample No. 3 illustrates that the polypropylene is degraded when it is not protected, such as by the inclusion of sulfur in the formula. This is most significantly shown by a comparison of the viscosity/shear data. Sample No. 3 was prepared with a much higher molecular weight polypropylene, yet the resulting blend had much lower viscosity at the indicated shear rates. Additionally, Sample No. 3 had a much lower tensile strength and impact strength.

EXAMPLE VII

Several full cured thermoplastic elastomer blends were prepared according to the procedure described in Example I except that triallylcyanurate (TAC), triallylphosphate (TAPA), and tris (2,3 dibromopropyl) phosphate (TDBP), respectively, were substituted for sulfur in several samples to demonstrate that these trifunctional monomers prevent polypropylene degradation during cross-linking of the elastomer phase components. Each of the trifunctional monomers were initially blended with the polypropylene at 370° F. for 3 minutes in the Banbury mixer at a level of 1 wt.%, basis PP. The specific formulations of the blends and mechanical properties are set forth in the following Table 8.

TABLE 8

| Sample No. | 1 | 2 | 3 | 4 |
|---|---|---|---|---|
| Composition | | | | |
| Elastomer[1], wt. % | 43.3 | 43.3 | 43.3 | 43.3 |
| Polypropylene, wt. % | 34.9[2] | 34.7[3] | 34.7[3] | 34.7[3] |
| Polyethylene[4], wt. % | 18.6 | 18.6 | 18.6 | 18.6 |
| Other, wt. % | | | | |
| Vulcup 40 KE | 2.8 | 2.8 | 2.8 | 2.8 |
| TAC | 0.3 | 0.3 | 0.3 | 0.3 |
| TAC | — | 0.35 | — | — |
| TAPA | — | — | 0.35 | — |
| TDBP | — | — | — | 0.35 |
| Sulfur | 0.1 | — | — | — |
| Properties | | | | |
| Viscosity/Shear | | | | |
| ($\eta$ at 7.15 sec$^{-1}$) | $6.15 \times 10^3$ | $5.24 \times 10^3$ | $4.62 \times 10^3$ | $5.57 \times 10^3$ |
| ($\eta$ at 1430 sec$^{-1}$) | $1.36 \times 10^2$ | $1.36 \times 10^2$ | $1.31 \times 10^2$ | $1.42 \times 10^2$ |
| Room Temp. Flex | | | | |
| Mod. $\times 10^{-3}$, psi | 25.1 | 23.6 | 22.1 | 21.4 |
| Tensile, Yield, psi | 1369 | 1814 | 1333 | 1268 |
| % Elong., Yield | — | — | — | — |
| Tensile, Fail, psi | 2175 | 2180 | 2229 | 2058 |
| % Elong., Fail | 402 | 305 | 305 | 348 |
| Tension Set, Fail | 202 | 135 | 145 | 170 |
| Chevrolet Droop Test | | | | |
| 270° F. | 1.2 | 1.2 | 1.2 | 1.4 |
| 300° F. | | 2.2 | | |
| Notched Izod at −40° F., ft. lbs/inch | 7.9 | 8.0 | DNB | 5.2 |
| Durometer/-/10 | -/41 | 45/40 | 45/39 | 43/38 |

[1] VISTALON ® 3708, Exxon Chemical Company U.S.A. EPDM: 75 Mooney Viscosity (ML 1 + 8′ at 212° F.); 64 wt. % ethylene; 3.4 wt. % diene (ENB).
[2] 20 MFR PP
[3] 0.5 MFR PP
[4] 6.5 MI, 0.922 g/cc density LDPE The results of Table 8 illustrate that the trifunctional monomers (TAC, TAPA and TDBP) are effective in preventing polypropylene degradation during elastomer phase curing. Furthermore, the employment of TAC and TAPA does not produce odors, a disadvantage with sulfur.

EXAMPLE XIII

Several fully cured thermoplastic elastomer blends were prepared as described in Example I except with varying amounts of sulfur, benzoquinone, iodine, and chloranil. These compounds are conventionally known free radical scavenging agents as indicated by their large Z values (cf, C. Walling, "Free Radicals in Solution", Wiley, New York, 1957, Secton 4.3d). The blends were prepared from the same formulation of Sample No. 6, Table 1. Each fully cured blend was then tested for melt-flowability with a 50 cc Barbender Plasticorder by plasticording for 14 minutes at 50 rpm with the oil at 200° C. The results are set forth in the following Table 9.

TABLE 9

| wt. % Additive | Z* VA[1] | MM[2] | Torque(Temp.) at 14 Minutes | Δ |
|---|---|---|---|---|
| None | — | — | 1.22 (201) | — |
| Sulfur, 0.25 | 470 | 0.075 | 1.49 (205) | 0.27 |
| Sulfur, 0.09 | 470 | 0.075 | 1.30 (200) | 0.08 |
| Benzoquinone, 0.25 | $10^3$ | 5.5 | 1.22 (198) | |
| Benzoquinone, 0.09 | $10^3$ | 5.5 | 1.22 (200) | 0 |
| Iodine, 0.25 | — | — | 1.22 (200) | 0 |
| Iodine, 0.09 | — | — | 1.22 (199) | −0.18 |
| Chloranil, 0.25 | $10^3$ | 0.26 | 1.21 (200) | 0 |
| Chloranil, 0.09 | $10^3$ | 0.26 | 1.16 (198) | −0.06 |

*ln ([Z]/[Z]$_0$) = Z ln ([M]/[M]$_0$)
[1] Vinyl Acetate
[2] Methyl Methyacrylate The results of Table 9 illustrate that benzoquinone, iodine, and chloranil, which are known free radical scavenging agents, provide no degradation protection to polypropylene when the elastomer phase of the blend of the invention is cross-linked in its presence. Additionally, the results show that at least 0.25 wt.% sulfur based upon the total weight of the blend, is required to provide any appreciable protection to the polypropylene during crosslinking.

The preceding examples can be repeated with similar success by substituting the generally and specifically described components and preparation conditions of this invention for those employed.

Various modifications of this invention can be made or followed in light of this disclosure and the discussion set forth above without departing from the spirit and scope thereof.

What is claimed is:

1. A cross-linked melt-flowable thermoplastic elastomer blend, comprising:

a blend of a monoolefin polymer elastomer of ethylene and propylene, with or without a copolymerizable polyene, and a cross-linkable low density polyethylene, having a density of no more than about 0.929 g/cc, essentially fully cured in the presence of a polypropylene to produce a non-melt-flowable discontinuous elastomer phase of substantially completely cross-linked monoolefin polymer elastomer and polyethylene intimately dispersed in a meltflowable continuous phase of polypropylene, the weight ratio of the discontinuous elastomer phase to melt-flowable continuous phase being at least 1:1, the polymer components being respectfully present in amounts of about 20 to about 50% monoolefin polymer elastomer, about 15 to about 50% low density polyethylene and about 25 to about 50% polypropylene, based upon the total weight of the polymer compound.

2. The blend of claim 1, wherein the monoolefin polymer elastomer and cross-linkable low density polyethylene are cured with an organic peroxide curing agent, the organic peroxide curing agent being present in an amount sufficient to substantially completely cross-link all the monoolefin polymer resin and cross-linkable polyethylene in the presence of the polypropylene.

3. The blend of claim 3, wherein monoolefin polymer elastomer and cross-linkable low density polyethylene are further cross-linked in the presence of from about 0.1 to about 0.5 wt.% triallylcyanurate, based upon the total weight of the cross-linkable components.

4. The blend of claim 1, including about 0.25 to about 1.0 wt.%, based upon the weight of polypropylene, of a compound capable of preventing degradation of polypropylene with the monoolefin polymer elastomer and cross-linkable low density polyethylene being fully cured in the presence thereof, said compound being selected from the group consisting of sulfur, triallylcyanurate, triallylphosphate, and tris (2,3-dibromopropyl) phosphate, and mixtures thereof.

5. The blend of claim 1, wherein the monoolefin polymer elastomer has a Mooney viscosity of from about 20 to about 120, ML 1+8' at 212° F., and contains from about 40 to about 90% by weight ethylene, said elastomer being selected from the group consisting of a saturated ethylene-propylene copolymer elastomer, an ethylene-propylene-unconjugated diene terpolymer elastomer, having an unconjugated diene content of from about 2.5 to about 10% by weight, and mixtures thereof.

6. The blend of claim 1, wherein the cross-linkable low density polyethylene has a density of from about 0.915 to about 0.929 g/cc and a melt index of from about 2 to about 30.

7. The blend of claim 1, wherein the polypropylene is an isotactic polypropylene of greater than 90% hot heptane insolubles having a melt flow rate of from about 0.5 to about 30.

8. The blend of claim 1, wherein the polymer components are respectively present in amounts of about 40 to about 45% monoolefin polymer elastomer, about 15 to about 20% low density polyethylene and about 30 to about 35% polypropylene, based upon the total weight of the polymer components.

9. A method for preparing the cross-linked melt-flowable thermoplastic elastomer blend of claim 1, comprising:

mixing a monoolefin polymer elastomer of ethylene and propylene, with or without a copolymerizable polyene, a cross-linkable low density polyethylene, having a density of no more than about 0.929 g/cc, and a curing agent therefor with a polypropylene resin and heating the resulting mixture to an elevated temperature for a sufficient period of time to fully cure the monoolefin polymer elastomer and polyethylene components to produce a non-melt-flowable discontinuous elastomer phase of substantially fully cross-linked monoolefin polymer elastomer and low density polyethylene intimately dispersed within a melt-flowable continuous phase of polypropylene, the elastomer, low density polyethylene and polypropylene polymeric components being present in amounts sufficient to provide a weight ratio of discontinuous elastomer phase to melt-flowable continuous phase of at least 1:1.

10. The method of claim 10, wherein the respective polymer components are mixed in amounts within the range of about 20 to about 50% monoolefin polymer elastomer, about 15 to about 40% cross-linkable low density polyethylene and about 20 to about 50% polypropylene, based upon the total weight of said polymer components.

11. The method of claim 10, wherein the curing agent is an organic peroxide, said curing agent being employed in an amount sufficient to provide substantially complete cross-linking of all the monoolefin polymer elastomer and cross-linkable low density polyethylene components in the presence of the polypropylene.

12. The method of claim 12, wherein about 0.1 to about 0.5 wt.% triallylcyanurate, based upon the weight of the monoolefin polymer elastomer and low density polyethylene present, is added to the mixture prior to subjecting the mixture to the elevated curing temperature.

13. The method of claim 13, wherein the monoolefin polymer elastomer, low density polyethylene, curing agent and triallylcyanurate are intimately mixed at an elevated temperature insufficient to cause curing of the polymer component prior to mixing with the polypropylene.

14. The method of claim 10, wherein a compound capable of preventing degradation of the polypropylene during curing of the cross-linkable polymer components is added to the mixture prior to subjecting the mixture to the elevated curing temperature, the compound being added in an amount of from about 0.1 to about 1.0 wt.%, based upon the weight of polypropylene, and being selected from the group consisting of sulfur, triallylcyanurate, triallylphosphate, tris (2,3-dibromopropyl) phosphate and mixtures thereof.

15. The method of claim 15, wherein the compound capable of preventing degradation of polypropylene is intimately mixed with the polypropylene at an elevated temperature prior to mixing the polypropylene with the monoolefin polymer elastomer and low density polyethylene.

16. The method of claim 10, wherein the monoolefin polymer elastomer has a Mooney viscosity of from about 20 to about 120, ML 1+8' at 212° F., and contains from about 40 to about 80% by weight ethylene, said elastomer being selected from the group consisting of a saturated ethylenepropylene copolymer elastomer, an ethylene-propylene-unconjugated diene terpolymer elastomer, having an unconjugated diene content of from about 2.5 to about 10% by weight, and mixtures thereof.

17. The method of claim 10, wherein the cross-linkable low density polyethylene has a density of from about 0.915 to about 0.929 g/cc and a melt index of from about 2 to about 30.

18. The method of claim 10, wherein the polypropylene is an isotactic polypropylene of greater than 99% hot heptane insolubles having a melt flow rate of from about 0.5 to about 30.

19. The method of claim 10, wherein the polymer components of the blend are present in respective amounts within the range of from about 40 to about 45% monoolefin polymer elastomer, about 15 to about 20% cross-linkable polyethylene and from about 30 to about 35% polypropylene, based upon the total weight of polymer components of the mixture.

20. The method of claim 20, wherein the monoolefin polymer elastomer and low density polyethylene are initially intimately mixed with an organic peroxide curing agent present in an amount sufficient to provide substantially complete cross-linking thereof and from about 0.1 to about 0.5 wt.% triallylcyanurate, based upon the weight of the polymer components, at an elevated temperature insufficient to cause cross-linking of said polymer components.

21. The method of claim 21, wherein a compound capable of preventing degradation of the polypropylene during curing of the elastomer and polyethylene polymer components is intimately mixed with the polypropylene prior to mixing the polypropylene with the elastomer, low density polyethylene, curing agent and triallylcyanurate mixture at an elevated temperature, said compound being added to the polypropylene in an amount of from about 0.25 to about 1.0% by weight of the polypropylene and being selected from the group consisting of sulfur, triallylcyanurate, triallylphosphate, tris (2,3-dibromopropyl) phosphate and mixtures thereof.

* * * * *